US011392697B2

(12) United States Patent
Gauthier et al.

(10) Patent No.: US 11,392,697 B2
(45) Date of Patent: Jul. 19, 2022

(54) DETECTION OF MALWARE IN DOCUMENTS

(71) Applicant: Oracle International Corporation, Redwood Shores, CA (US)

(72) Inventors: François Gauthier, Brisbane (AU); Scott Gaetjen, Plano, TX (US); Michael Blair, New Farm (AU)

(73) Assignee: Oracle International Corporation, Redwood Shores, CA (US)

( * ) Notice: Subject to any disclaimer, the term of this patent is extended or adjusted under 35 U.S.C. 154(b) by 423 days.

(21) Appl. No.: 16/695,953

(22) Filed: Nov. 26, 2019

(65) Prior Publication Data
US 2021/0157914 A1    May 27, 2021

(51) Int. Cl.
*G06F 21/56* (2013.01)
*G06N 5/04* (2006.01)
*G06N 20/00* (2019.01)

(52) U.S. Cl.
CPC .............. *G06F 21/563* (2013.01); *G06N 5/04* (2013.01); *G06N 20/00* (2019.01); *G06F 2221/033* (2013.01)

(58) Field of Classification Search
CPC ............ G06F 21/563; G06F 2221/033; G06F 21/562; G06N 5/04; G06N 20/00; G06N 5/003; G06N 20/20
See application file for complete search history.

(56) References Cited

U.S. PATENT DOCUMENTS

2018/0039779 A1* 2/2018 Li ..................... G06F 21/566
2020/0279105 A1* 9/2020 Muffat ................ G06N 3/08

OTHER PUBLICATIONS

Aboud, E. et al., "Detection of malicious VBA Macros Using Machine Learning Methods", Proceedings of the 26th AIAI Irish Conference on Artificial Intelligence and Cognitive Science (AICS 2018), Dec. 6-7, 2018, Dublin, Ireland ( pages).
Cohen, A. et al., "Structural Feature Extraction Methodology for the Detection of Malicious Office Documents Using Machine Learning Methods", Expert Systems with Applications, vol. 63, pp. 324-343, Nov. 2016 ( pages).
Dechaux, J. et al., "Office Documents: New Weapons of Cyberwarfare", ESIEA Operational Virology and Cryptology Lab, France, Feb. 11, 2017 (29 pages).

(Continued)

*Primary Examiner* — J. Brant Murphy
(74) *Attorney, Agent, or Firm* — Ferguson Braswell Fraser Kubasta PC (57) ABSTRACT

A method may include extracting, from a document, first content of a first content type and second content of a second content type, deriving first features from the first content and second features from the second content, and generating a first prediction by applying a first supervised model to the first features and a second prediction by applying a second supervised model to the second features. The first supervised model may correspond to the first content type, and the second supervised model may correspond to the second content type. The method may further include combining the first prediction and the second prediction to predict that the document comprises malicious code.

20 Claims, 10 Drawing Sheets

(56) References Cited

OTHER PUBLICATIONS

Kim, S. et al., "Obfuscated VBA Macro Detection Using Machine Learning", 48th Annual IEEE/IFIP International Conference on Dependable Systems and Networks, Luxembourg, Jun. 25-28, 2018 (12 pages).

Menahem, E. et al., "Improving Malware Detection by Applying Multi-inducer Ensemble", Computational Statistics & Data Analysis, vol. 53, Issue 4, pp. 1483-1494, Feb. 15, 2009 (12 pages).

Nissim, N. et al., "ALDOCX: Detection of Unknown Malicious Microsoft Office Documents Using Designated Active Learning Methods Based on New Structural Feature Extraction Methodology", IEEE Transactions on Information Forensics and Security vol. 12, Issue 3, pp. 631-646, Mar. 2017 (16 pages).

Smutz, C. et al., "Preventing Exploits in Microsoft Office Documents Through Content Randomization", Proceedings of the 18th International Symposium on Research in Attacks, Intrusions, and Defenses, Kyoto, Japan, Nov. 2-4, 2015, vol. 9404, pp. 225-246 (22 pages).

Rudd, E.M. et al., "MEADE: Towards a Malicious Email Attachment Detection Engine", IEEE International Symposium on Technologies for Homeland Security, Woburn, MA, USA, Oct. 23-24, 2018 (9 pages).

\* cited by examiner

Supervised Model
Accuracy Results
350

| Classifier | Text F1 | Metadata F1 | VBA F1 |
|---|---|---|---|
| K-Nearest Neighbours | 0.91 | 0.89 | 0.88 |
| Support Vector Machine | 0.38 | 0.77 | 0.92 |
| Decision Tree | 0.88 | 0.90 | 0.98 |
| Naïve Bayes | 0.9 | 0.87 | 0.95 |
| Random Forest | 0.92 | 0.92 | 0.95 |

Metadata Content
420

| FILEID | PERSON_NAME |
|---|---|
| 5304 | A Company |
| 48428 | R. Information |
| 53457 | Investments, L |
| 62523 | Proposals A. Conversion |
| 62891 | Appendix A. Although |
| 63065 | King Kong |
| 63730 | S. Commissioner |
| 68866 | Gov. Printing Office |
| 83385 | Marketing, L |
| 83889 | Carpet V. Floor |
| 89042 | Transaction B. Neither |
| 89684 | Transaction, L |
| 91247 | S. Thesis |
| 93292 | Attachment D. Referenced |
| 95392 | Assets J. Grass |
| 571279 | A. Account |
| 6952 | Errors, Secondary E |
| 7280 | B Company |
| 9440 | C Company |
| 9651 | Operation al Unit |
| 43921 | Loc al Furnishing |

FIG. 4B

Executable Code
Content
450

```
1   Sub ObjRun (CommandMoveTo As String, CopyTo01 As String, CopyTo02 As String,
2           CopyTo03 As String, AllUsersProfile As String)
3   Dim certutilCommand As String
4   cermoveCommand = "cmd.exe /c copy %windir%\system32\certutil.exe %temp%\cm.tmp"
5   certutilCommand = "cmd.exe /c %temp%\cm.tmp -decode "
6   Set objws = CreateObject("Wscript.Shell")
7   objws.Run CommandMoveTo, 0, True
8   objws.Run cermoveCommand, 0, True
9   objws.Run certutilCommand & AllUsersProfile & "pass1.txt " & CopyTo01, 0, True
10  objws.Run certutilCommand & AllUsersProfile & "pass2.txt " & CopyTo02, 0, True
11  objws.Run certutilCommand & AllUsersProfile & "pass3.txt " & CopyTo03, 0, True
12  objws.Run "esentutl.exe /y " & CopyTo01 & " /d " & AllUsersProfile & "UUP.exe" & " /o", 0, True
13  objws.Run "esentutl.exe /y " & CopyTo02 & " /d " & AllUsersProfile & "libcurl.dll" & " /o", 0, True
14  objws.Run AllUsersProfile & "UUP" & ".e" & "xe", 0, False
15  objws.Run "cmd.exe /c del /f /s /q " & AllUsersProfile & "*.txt", 0, False
16  End Sub
```

DETECTION OF MALWARE IN DOCUMENTS

BACKGROUND

Malicious documents are commonly used to initially infect victims by executing arbitrary commands on the victim's computer, or download malicious programs from a server owned by the attacker. Of all the kinds of attachments (e.g., executables, Java Archive (JAR), Zip files, Portable Document Format (PDF) and Office documents) that can be used to initially infect a host, Office documents became significantly more common in recent years. Most commonly used industrial malware detection approaches rely on manually crafted malware signatures to detect malicious documents. However, signature-based approaches to detecting malware may be easily evaded.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including extracting, from a document, first content of a first content type and second content of a second content type, deriving first features from the first content and second features from the second content, and generating a first prediction by applying a first supervised model to the first features and a second prediction by applying a second supervised model to the second features. The first supervised model corresponds to the first content type, and the second supervised model corresponds to the second content type. The method further includes combining the first prediction and the second prediction to predict that the document comprises malicious code.

In general, in one aspect, one or more embodiments relate to a system including a memory coupled to a computer processor, a repository configured to store a document including first content of a first content type and second content of a second content type, a first supervised model corresponding to the first content type, and a second supervised model corresponding to the second content type. The system further includes a document analyzer, executing on the computer processor and using the memory, configured to extract, from the document, the first content and the second content, derive first features from the first content and second features from the second content, generate a first prediction by applying the first supervised model to the first features and a second prediction by applying the second supervised model to the second features, and combine the first prediction and the second prediction to predict that the document comprises malicious code.

In general, in one aspect, one or more embodiments relate to a method including extracting text content and metadata content from a document, deriving text features from the text content and metadata features from the metadata content, generating a text prediction by applying a supervised text model to the text features and a metadata prediction by applying a supervised metadata model to the metadata features, and combining the text prediction and the metadata prediction to predict that the document comprises malicious code.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to detecting malicious code in a document. In one or more embodiments, text, metadata and/or executable code contents are extracted from the document. Categorical and numerical features are then derived from the contents. The features may be encoded as vectors. Predictions that each type of content (e.g., text, metadata and/or executable code) includes malicious code may be generated by applying supervised models to the features. For example, the supervised models may be random forest, k-nearest neighbors models, etc. The content-specific predictions may be combined (e.g., by a voting algorithm) into an overall prediction that the document includes malicious code. In one or more embodiments, an operation of the malicious code is identified using the features used to generate the prediction.

Figure 1A:
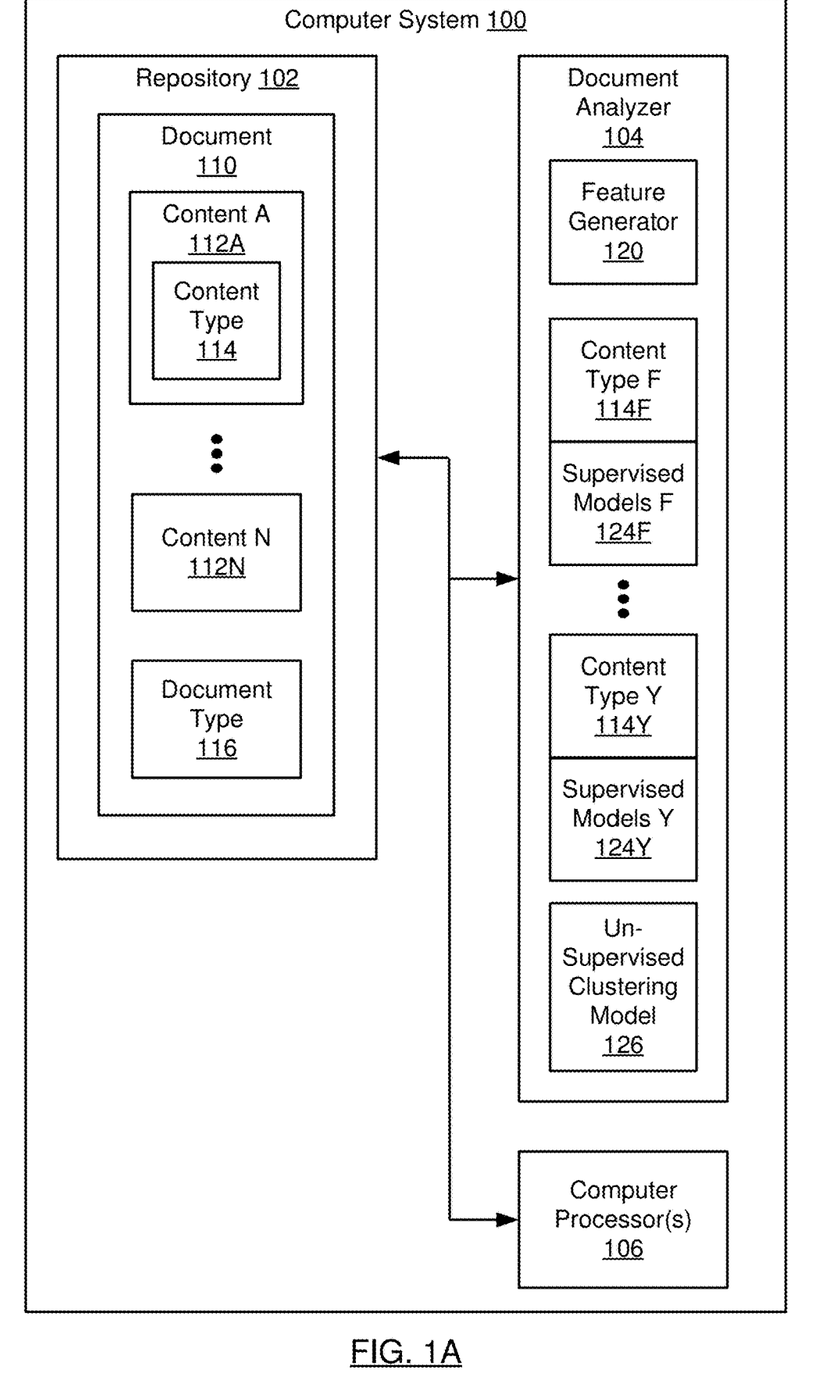
FIG. 1A and FIG. 1B show a system in accordance with one or more embodiments of the invention.

FIG. 1A shows a computer system (100) in accordance with one or more embodiments of the invention. As shown in FIG. 1A, the computer system (100) includes a repository (102), a document analyzer (104), and one or more computer processors (106). In one or more embodiments, the computer system (100) takes the form of the computing system (500) described with respect to FIG. 5A and the accompanying description below or takes the form of the client device (526) described with respect to FIG. 5B. In one or more embodiments, the computer processor(s) (106) takes the form of the computer processor(s) (502) described with respect to FIG. 5A and the accompanying description below.

In one or more embodiments, the repository (102) may be any type of storage unit and/or device (e.g., a file system, database, collection of tables, or any other storage mechanism) for storing data. Further, the repository (102) may include multiple different storage units and/or devices. The multiple different storage units and/or devices may or may not be of the same type or located at the same physical site.

In one or more embodiments, the repository (102) includes a document (110). In one or more embodiments, the document (110) has a document type (116). The document type (116) may be a specific category that corresponds to the file format of the document (110). For example, the document type (116) may be "Word", "PowerPoint", "Excel", or any other specific type of document that corresponds to a file format. Alternatively, the document type (116) may be a general category, such as a text document, diagram, spreadsheet, etc.

Figure 1B:
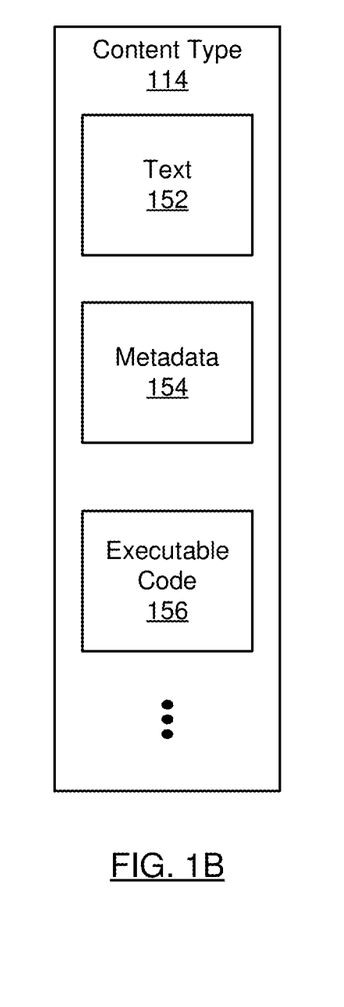

The document (110) may include contents (112A, 112N). Each content (112A) has a content type (114). Turning to FIG. 1B, the content type (114) may be text (152), metadata (154), executable code (156), or any other type of content. For example, content (112A) whose content type (114) is text (152) may include keywords associated with the document (110) that are displayed in a graphical user interface (GUI) (e.g., as shown in the "social engineering" text of FIG. 4A aimed at manipulating the behavior of a user). As another example, content (112A) whose content type (114) is metadata (154) may include properties associated with the document (110), such as author name, last saved date, document size, number of words, country of origin, etc. As another example, content (112A) whose content type (114) is executable code (156) may include macro code included in the document (110), such as Visual Basic for Applications (VBA) macro code.

In one or more embodiments, the document analyzer (104) may be implemented in hardware (e.g., circuitry), software, firmware, and/or any combination thereof. In one or more embodiments, the document analyzer (104) includes a feature generator (120), content types (114F, 114Y), and supervised models (124F, 124Y). The feature generator (120) may include functionality to derive features from contents (112A, 112N). The feature generator (120) may include functionality to store features in the repository (102). In one or more embodiments, features may represent aggregations or summaries of contents (112A, 112N). For example, features derived from contents (112A, 112N) whose content type (114) is text (152) may be counts of various keywords, which may be encoded as a vector.

Examples of features derived from contents (112A, 112N) whose content type (114) is metadata (154) may be various properties of the document (110). The collection of features derived from content (112A) whose content type (114) is metadata (154) may be represented using one or more of the following encodings:

1) One-hot encoding: encoding a categorical feature using vectors with binary values where a single value is set to 1, and all other values are set to 0.

2) Scale: normalizing a numerical feature to a value between 0 and 1.

3) Top: encoding a categorical feature as 1 if the value is the most common value, and 0 otherwise.

4) Length: encoding a string-based feature as its length.

5) Count: encoding a list-based features as its number of elements.

Examples of features derived from contents (112A, 112N) whose content type (114) is executable code (156) may be counts of various keywords (e.g., keywords corresponding to commands in VBA macro code or some other programming language). The collection of features derived from content (112A) whose content type (114) is executable code (156) may be represented as a vector of token counts.

A collection of supervised models (124F) is associated with each content type (114F). Each supervised model in the collection of supervised models (124F) may be a type of machine learning classifier such as a k-nearest neighbors, support vector machine, decision tree, naïve Bayes, random forest, etc. Each supervised model includes functionality to generate a prediction regarding whether content (112A) corresponding to the content type (114F) associated with the collection of supervised models (124F) is malicious. Each supervised model may assign a confidence level (e.g., probability) to the prediction.

In one or more embodiments, the unsupervised clustering model (126) includes functionality to group document types (116) corresponding to similar distributions of features. The unsupervised clustering model (126) may be used balance a set of documents (110) to train the supervised models (124F, 124Y). Each document type (116) may be represented as a vector of feature counts (e.g., feature frequencies). The unsupervised clustering model (126) may perform hierarchical clustering analysis (HCA). For example, each document type (116) may initially be assigned to its own cluster, and bottom-up HCA may then recursively merge pairs of clusters based on pair-wise Manhattan distance. Alternatively, the unsupervised clustering model (126) may be implemented using other clustering techniques, such as k-means clustering, centroid-based clustering, distribution-based clustering, density-based clustering, naïve Bayes, etc.

The data used to train the supervised models (124F) may include sets of documents (110) labeled as "malicious" or "benign". The relative importance (e.g., weighting) of features in the supervised models (124F) may be learned, in part, based on the training documents.

The document analyzer (104) may include functionality to extract contents (112A, 112N) from a document (110). The document analyzer (104) may include functionality to derive features from the contents (112A, 112N). In one or more embodiments, the document analyzer (104) includes functionality to generate a prediction regarding whether the document (110) includes malicious code.

In one or more embodiments, the computer processor (106) includes functionality to execute the document analyzer (104).

While FIG. 1A shows a configuration of components, other configurations may be used without departing from the scope of the invention. For example, various components may be combined to create a single component. As another example, the functionality performed by a single component may be performed by two or more components.

Figure 2A:
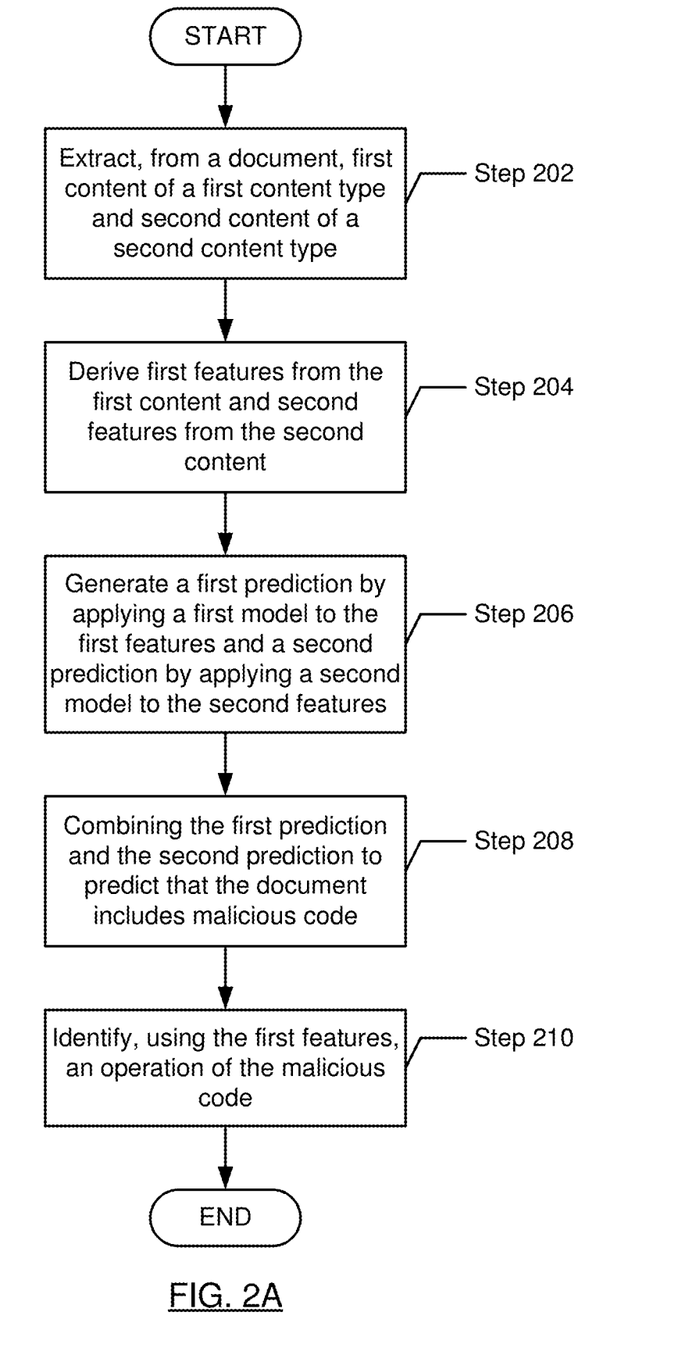
FIG. 2A and FIG. 2B show flowcharts in accordance with one or more embodiments of the invention.

FIG. 2A shows a flowchart in accordance with one or more embodiments of the invention. The flowchart depicts a process for detecting malicious code. One or more of the steps in FIG. 2A may be performed by the components (e.g., the document analyzer (104) of the computer system (100)), discussed above in reference to FIG. 1. In one or more embodiments of the invention, one or more of the steps shown in FIG. 2A may be omitted, repeated, and/or performed in parallel, or in a different order than the order shown in FIG. 2A. Accordingly, the scope of the invention should not be considered limited to the specific arrangement of steps shown in FIG. 2A.

Initially, in Step 202, first content of a first content type and second content of a second content type are extracted from a document. For example, the document may be received as an attachment to an email message. The document analyzer may extract the first content and the second content from the document using one or more software tools. For example, the document analyzer may use the Oracle Outside In software tool to extract contents whose content type is text or metadata, and the Apache Poor Obfuscation Implementation (POI) tool to extract contents whose content type is executable code (e.g., VBA macro code).

In Step 204, first features are derived from the first content and second features are derived from the second content. When the content type is "text", the document analyzer may split the text content into words and use the bag-of-words approach to represent the text as a multiset of its words. The document analyzer may remove punctuation from the text and convert the words to lowercase. The document analyzer may apply the term frequency-inverse document frequency (TFIDF) approach to score the words according to the relative importance of each word in a collection of training documents. After the TFIDF calculations, text features may be encoded as a vector of TFIDF scores, where each position in the vector corresponds to a word. When the content type is "metadata", the document analyzer may encode the metadata content as metadata features using one or more of the following previously described encodings: one-hot, scale, top, length, and count. When the content type is "executable code", the document analyzer may encode the executable code content as executable code features using a vector of token counts. For example, the tokens may be extracted by a lexer based on the language specification for the executable code.

In Step 206, a first prediction is generated by applying a first supervised model to the first features and a second prediction is generated by applying a second supervised model to the second features. The first supervised model may correspond to the first content type (e.g., content type "metadata"), and the second supervised model may correspond to the second content type (e.g., content type "text"). The first and second supervised models may be models (e.g., random forest, k-nearest neighbors, etc.) that performed with higher accuracy on training documents than other models, as described in Step 260 below. In one or more embodiments, the first prediction represents a confidence level that the first features correspond to the inclusion of malicious code in the document. For example, if the first content type is "metadata", the first supervised model may assign a confidence level based on metadata features such as paragraph count, number of document saves, number of authors, etc. Alternatively, if the first content type is "executable code", the first supervised model may assign a confidence level based on executable code features such as the number of concatenation operations (e.g., as indicated by the "plus" token), which may be an indication of obfuscation attempts. Similarly, the second prediction represents a confidence level that the second content corresponds to the inclusion of malicious code in the document.

In Step 208, the first prediction and the second prediction are combined to predict that the document comprises malicious code. In one or more embodiments, the document analyzer combines the first prediction and the second prediction using a voting algorithm. For example, the voting algorithm may predict that the document comprises malicious code when either the first prediction or the second prediction predicts that the document comprises malicious code. Continuing this example, the voting algorithm may predict that the document comprises malicious code when either the first prediction or the second prediction exceeds a threshold (e.g., a threshold confidence level). As another example, a "biased" voting algorithm may predict that the document includes malicious code when the supervised model with the highest accuracy (e.g., the supervised model with the highest F1 score) predicts that the document comprises malicious code.

In Step 210, an operation of the malicious code is identified using the first features. In one or more embodiments, the document analyzer identifies the operation based on one or more features used by the first supervised model to generate the first prediction. For example, when the executable code feature "number of concatenation operations" is large, the document analyzer may identify the concatenation operation as the operation of the malicious code. As another example, when the text feature "powershell" appears with a high count, the document analyzer may identify the powershell command as the operation of the malicious code. In one or more embodiments, the document analyzer explains the reason for predicting that the document includes malicious code by generating a report that includes a list of the features used by the first supervised model to generate the first prediction.

Figure 2B:
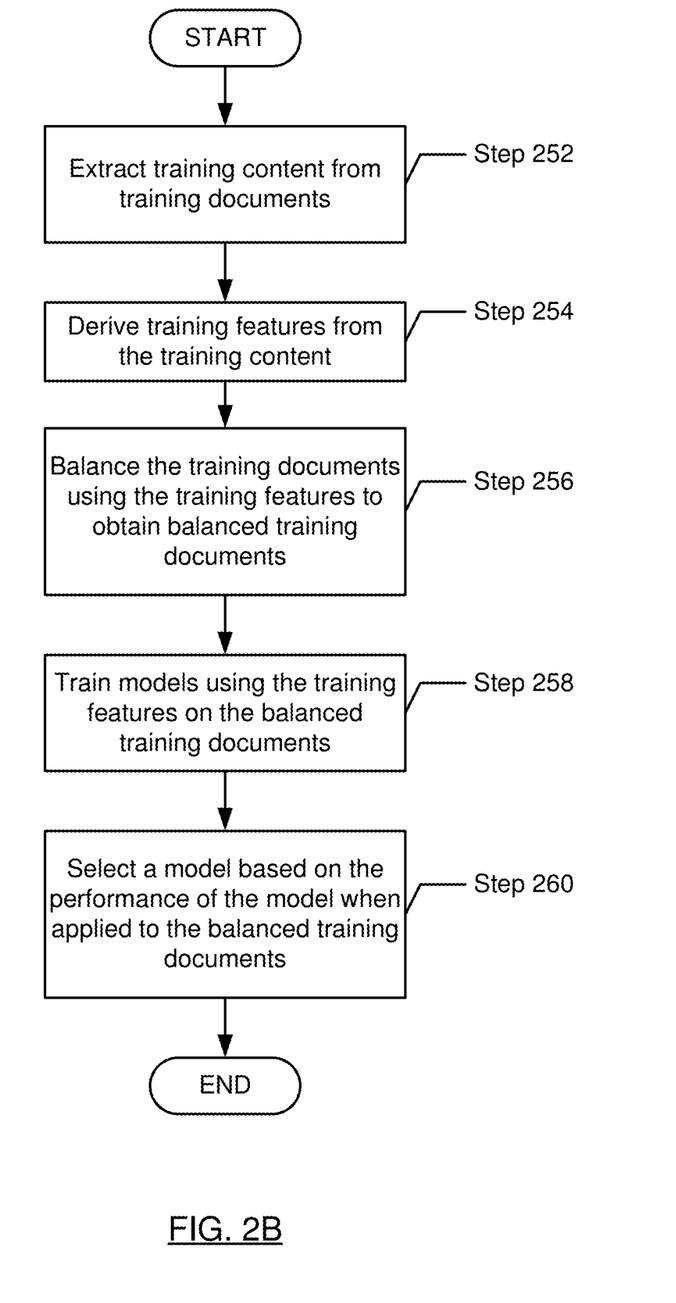

FIG. 2B shows a flowchart in accordance with one or more embodiments of the invention. The flowchart depicts a process for training a model. One or more of the steps in FIG. 2B may be performed by the components (e.g., the document analyzer (104) of the computer system (100)), discussed above in reference to FIG. 1. In one or more embodiments of the invention, one or more of the steps shown in FIG. 2B may be omitted, repeated, and/or performed in parallel, or in a different order than the order shown in FIG. 2B. Accordingly, the scope of the invention should not be considered limited to the specific arrangement of steps shown in FIG. 2B.

Initially, in Step 252, training content is extracted from training documents. The training documents may include documents of multiple document types (e.g., PowerPoint, Excel, Word, etc.). In one or more embodiments, the document analyzer extracts the training content from the training documents using one or more software tools (see description of Step 202 above).

In Step 254, training features are derived from the training content (see description of Step 204 above).

In Step 256, the training documents are balanced, using the training features, to obtain balanced training documents. In one or more embodiments, the document analyzer balances the training documents by applying unsupervised clustering to group document types sharing similar distributions of training features. For example, the document analyzer may apply bottom-up HCA to initially assign each document type to its own cluster, where the document type is represented as a vector of feature frequencies. The bottom-up HCA process then recursively merges clusters based on the pair-wise Manhattan distances of the vectors of feature frequencies corresponding to the clusters. The document analyzer may then balance each of the resulting clusters to include an equal number of benign and malicious training documents.

Figure 3A:
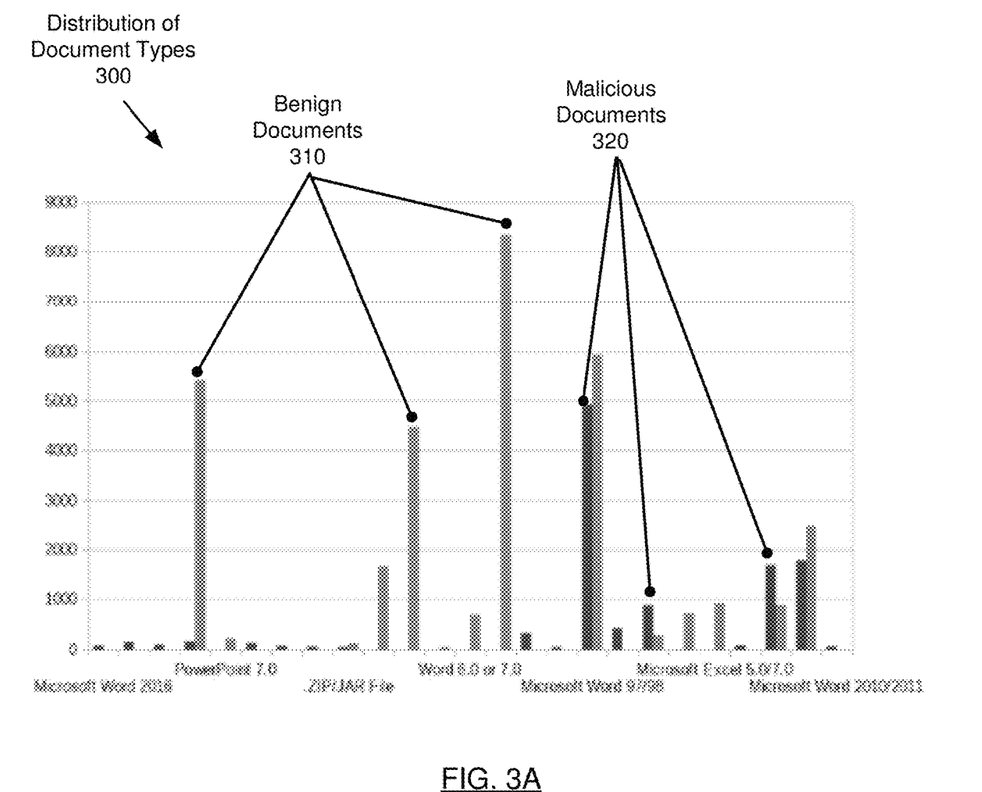
FIG. 3A and FIG. 3B show examples in accordance with one or more embodiments of the invention.

As an example, when the bottom-up HCA process was applied to training documents with the distribution of document types shown in FIG. 3A, the resulting clusters showed that seemingly different document types (e.g., Microsoft Word 2010 and Microsoft Word 2016) shared very similar metadata content distributions. Thus, the imbalance in document types in this case resulted in a minor imbalance in metadata content distributions, after performing clustering on the document types.

In Step 258, models are trained using the training features on the balanced training documents. In one or more embodiments, the document analyzer applies statistical approaches to select the most relevant training features to include in the supervised model (e.g., to reduce the dimensionality of the training features). For example, the most relevant categorical features (e.g., encoded as one-hot or top) may be selected using Chi-square analysis, and the most relevant numerical features (e.g., encoded as scale, length, various counts) may be selected using analysis of variance (ANOVA).

In Step 260, a supervised model is selected from the supervised models based on the performance of the supervised model, relative to the performance of the supervised models, when applied to the balanced training documents. The document analyzer may select the supervised model with the highest accuracy (e.g., the supervised model with the highest F1 score). The document analyzer may also use a grid search strategy, coupled to cross-validation (e.g., 10-fold cross-validation) to automatically tune the hyperparameters of the selected supervised model.

Figure 3B:
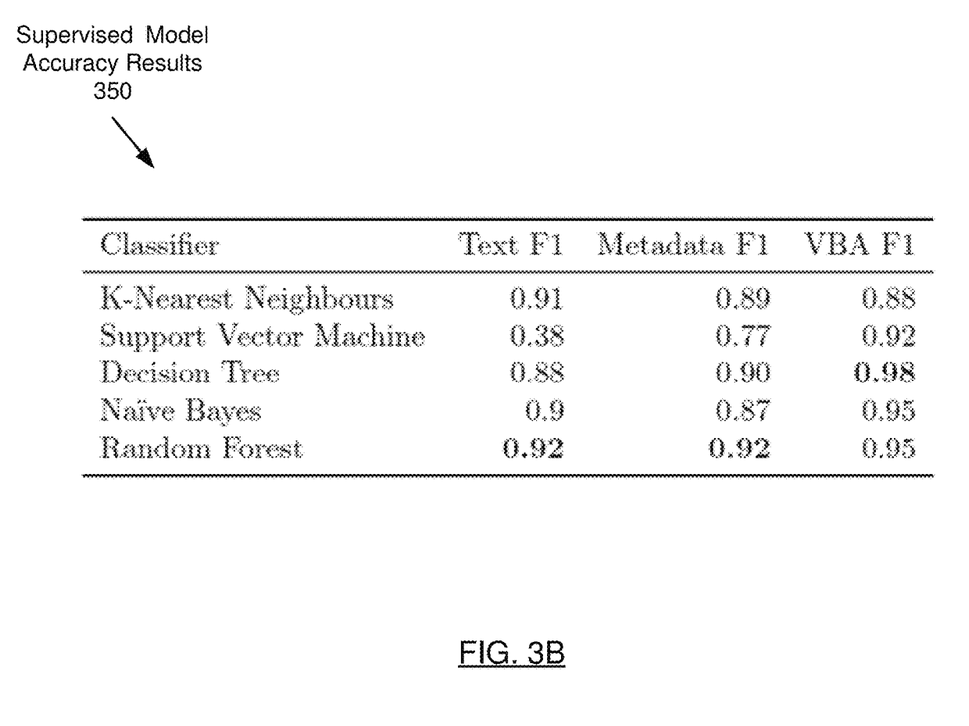

FIG. 3A shows the distribution of document types (300) for the documents used to train the models. For example, the distribution of document types (300) indicates the number of benign documents (310) and the number of malicious documents (320) corresponding to different document types. FIG. 3B shows supervised model accuracy results (350) in terms of average F1 scores after 10-fold cross-validation on text, metadata, and executable (VBA) code features for different types of supervised models. The highest average F1 scores showed that random forest performed best for text and metadata content, while decision tree performed best for VBA content. The accuracy of the combined (e.g., ensemble) model using biased voting (which was empirically determined as the highest performing voting strategy for the training documents) resulted an F1 score of 0.97.

Figure 4A:
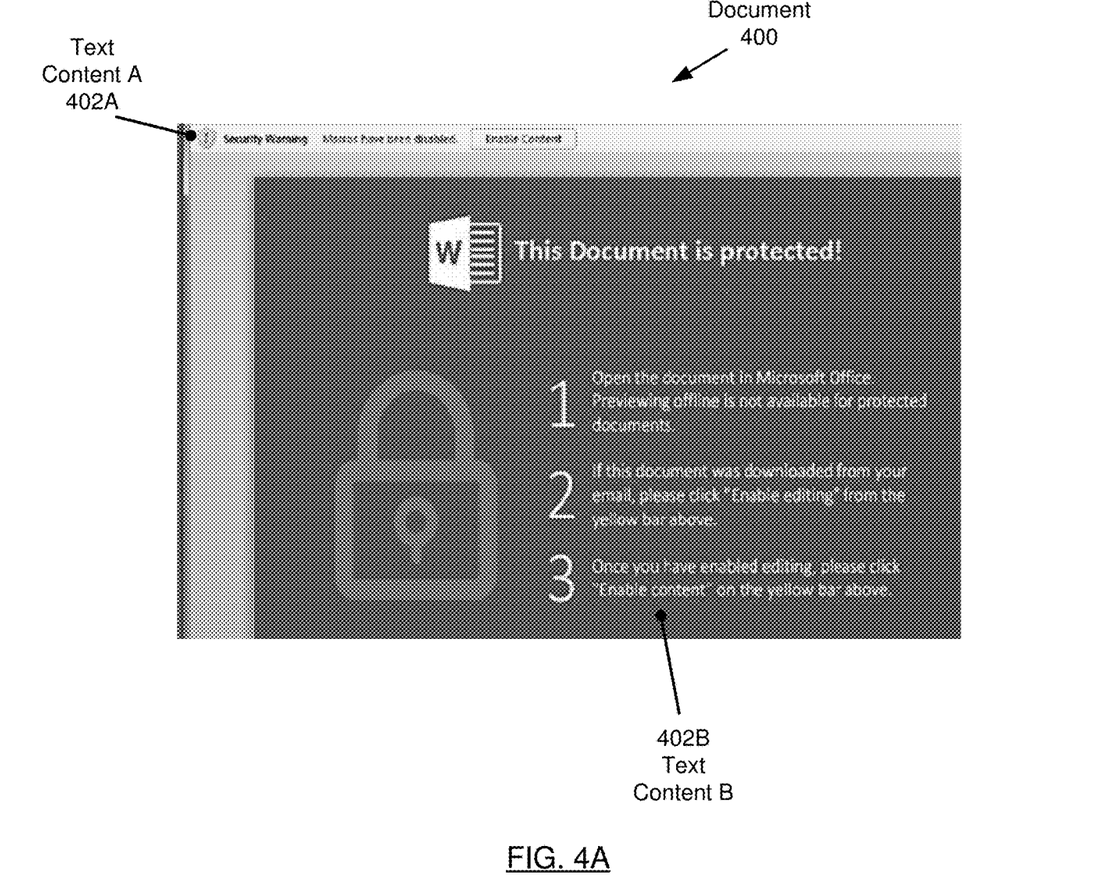
FIG. 4A, FIG. 4B, and FIG. 4C show examples in accordance with one or more embodiments of the invention.
Figure 4B:
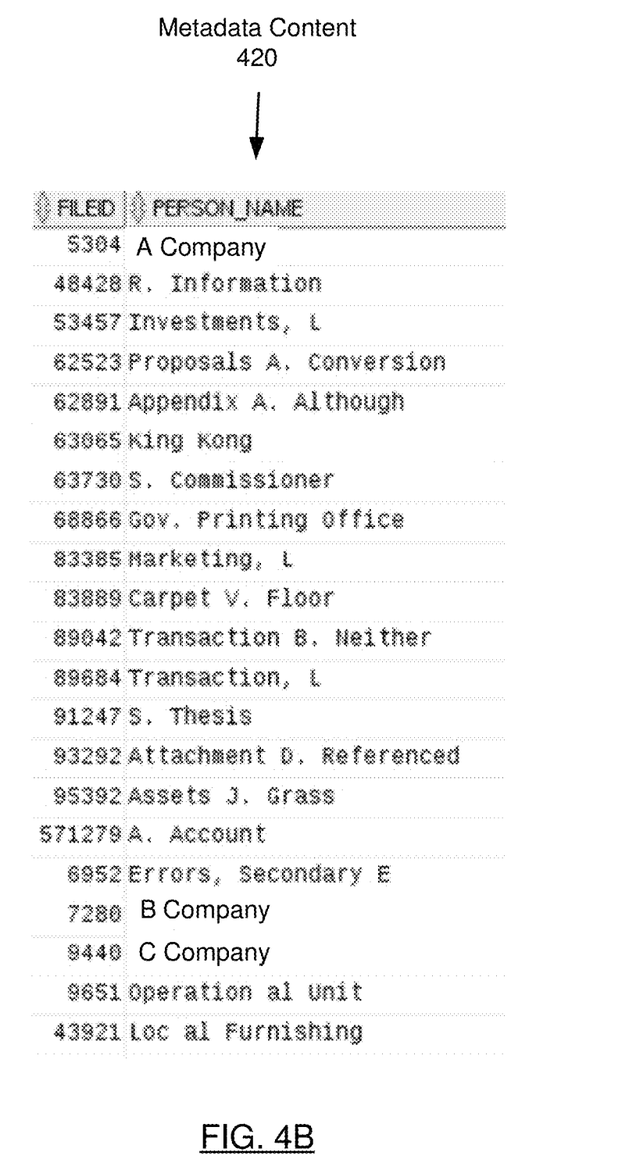
Figure 4C:
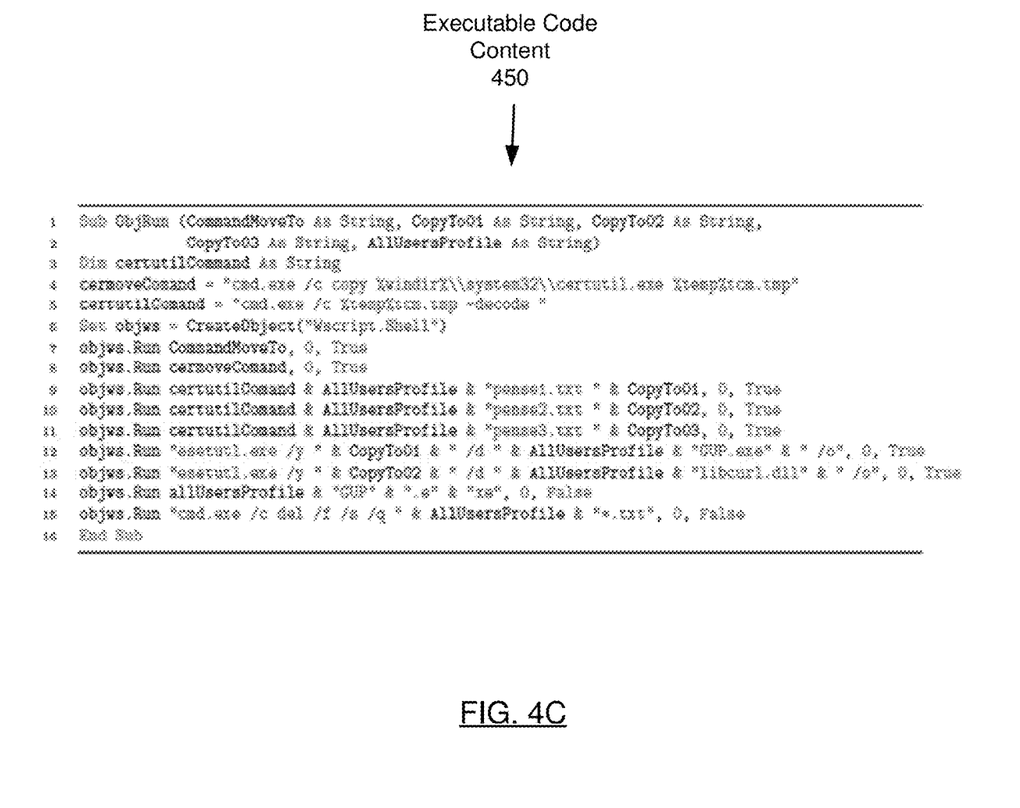

The following examples are for explanatory purposes only and not intended to limit the scope of the invention. FIG. 4A, FIG. 4B, and FIG. 4C show an implementation example in accordance with one or more embodiments of the invention. FIG. 4A shows a document (400) ((110) in FIG. 1) that includes text contents (402A, 402B) ((112A, 112N) in FIG. 1A). The text contents (402A, 402B) are malicious content displayed in a graphical user interface (GUI) in a "social engineering" attempt to trick a user into clicking on a button that will activate malicious code. FIG. 4B and FIG. 4C show metadata content (420) and executable code content (450), respectively, of the document (400). The document analyzer extracts the text contents (402A, 402B), metadata content (420), and executable code content (450) from the document (400) using the Outside In software tool (e.g., or a tool with comparable functionality). The text contents (402A, 402B) contain a high frequency of the word "enable", which is a feature shared with malicious text content learned by a text model trained on text content. The text model predicts that the text contents (402A, 402B) are malicious with a confidence level of 0.9.

The metadata content (420) shows examples of values for a "person name" property of the document (400) that have features similar to fake author names learned by a metadata model trained on metadata content. The metadata model predicts that the metadata content (420) is malicious with a confidence level of 0.8.

The executable code content (450) contains tokens that correspond to downloading files (code not shown), decodes the files using a legitimate program, copies the files with a proper file extension, again using a legitimate program, and uses a legitimate program with a malicious library to execute shellcode. The combination of the token "shell" and the tokens corresponding to downloading files match features extracted from malicious executable code content learned by an executable code model trained on executable code content. The executable code model predicts that the executable code content (450) is malicious with a confidence level of 0.6.

The document analyzer then combines the individual content type-specific predictions via a voting algorithm into an overall prediction that the document (400) includes malicious code. The document analyzer uses a biased voting algorithm, where the prediction of the supervised model with the highest accuracy is used as the combined prediction. In this case, the metadata-specific supervised model has the highest accuracy (e.g., the highest F1 score), and thus the malicious metadata prediction is used as the overall prediction regarding whether the document (400) includes malicious code. Since, in this case, the malicious metadata prediction of 0.8 exceeds a threshold level of 0.75, the document analyzer predicts that the document (400) includes malicious code.

Figure 5A:
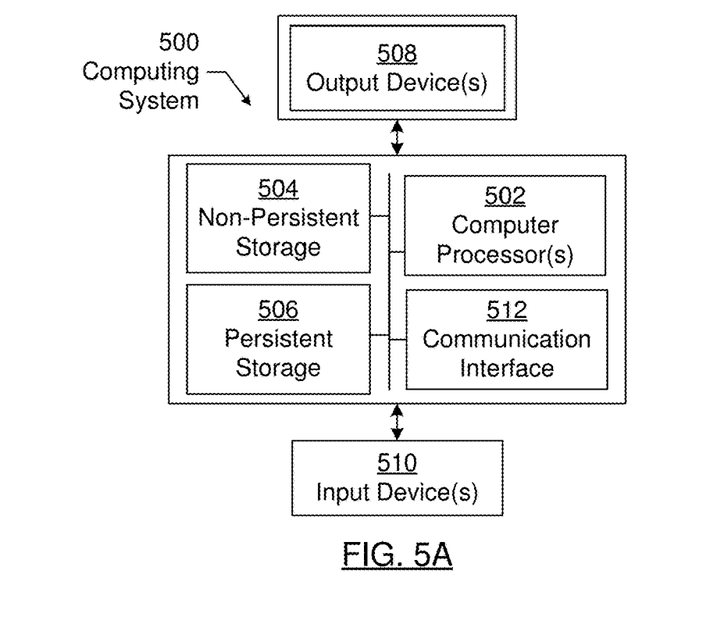
FIG. 5A and FIG. 5B show computing systems in accordance with one or more embodiments of the invention.

Embodiments disclosed herein may be implemented on a computing system specifically designed to achieve an improved technological result. When implemented in a computing system, the features and elements of this disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities that implement the features and elements of the disclosure.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
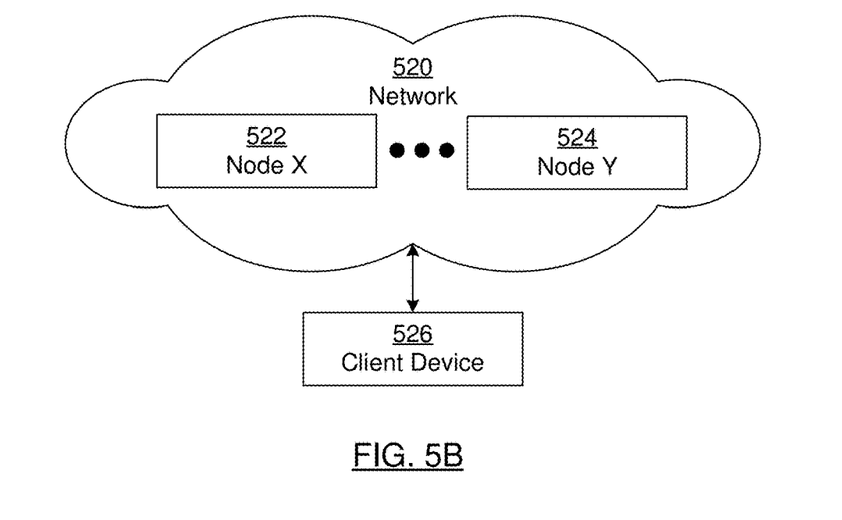

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
   extracting, from a document, first content of a first content type and second content of a second content type;
   deriving first features from the first content and second features from the second content;
   generating a first prediction by applying a first supervised model to the first features and a second prediction by applying a second supervised model to the second features, the first supervised model corresponding to the first content type, and the second supervised model corresponding to the second content type; and
   combining the first prediction and the second prediction to predict that the document comprises malicious code.

2. The method of claim 1, further comprising:
   extracting training content from a plurality of training documents of a plurality of document types;
   deriving training features from the training content;
   balancing the plurality of training documents using the training features to obtain a balanced plurality of training documents; and
   training, using the training features, a plurality of models on the balanced plurality of training documents.

3. The method of claim 2, wherein balancing the plurality of training documents comprises:
   applying unsupervised clustering to the plurality of document types based on similarities among the training features derived from the plurality of training documents.

4. The method of claim 2, further comprising:
   selecting a model from the plurality of models based on the performance of the model, relative to the performance of the plurality of models, when applied to the balanced plurality of training documents.

5. The method of claim 1, wherein the first content type and the second content type are selected from the group comprising text, metadata, and executable code.

6. The method of claim 1, further comprising:
   in response to predicting that the document comprises malicious code, identifying, using the first features, an operation of the malicious code.

7. The method of claim 1, wherein combining the first prediction and the second prediction comprises applying a voting algorithm to the first prediction and the second prediction.

8. A system, comprising:
   a memory coupled to a computer processor;
   a repository configured to store a document comprising first content of a first content type and second content of a second content type;
   a first supervised model corresponding to the first content type;
   a second supervised model corresponding to the second content type; and
   a document analyzer, executing on the computer processor and using the memory, configured to:
      extract, from the document, the first content and the second content,
      derive first features from the first content and second features from the second content,
      generate a first prediction by applying the first supervised model to the first features and a second prediction by applying the second supervised model to the second features, and
      combine the first prediction and the second prediction to predict that the document comprises malicious code.

9. The system of claim 8, wherein the document analyzer is further configured to:
   extract training content from a plurality of training documents of a plurality of document types,
   derive training features from the training content,
   balance the plurality of training documents using the training features to obtain a balanced plurality of training documents, and
   train, using the training features, a plurality of models on the balanced plurality of training documents.

10. The system of claim 9, wherein the document analyzer is further configured to balance the plurality of training documents by:
    applying unsupervised clustering to the plurality of document types based on similarities among the training features derived from the plurality of training documents.

11. The system of claim 9, wherein the document analyzer is further configured to:
    select a model from the plurality of models based on the performance of the model, relative to the performance of the plurality of models, when applied to the balanced plurality of training documents.

12. The system of claim 8, wherein the first content type and the second content type are selected from the group comprising text, metadata, and executable code.

13. The system of claim 8, wherein the document analyzer is further configured to:
    in response to predicting that the document comprises malicious code, identify, using the first features, an operation of the malicious code.

14. The system of claim 8, wherein the document analyzer is further configured to combine the first prediction and the second prediction by applying a voting algorithm to the first prediction and the second prediction.

15. A method, comprising:
    extracting text content and metadata content from a document;
    deriving text features from the text content and metadata features from the metadata content;

generating a text prediction by applying a supervised text model to the text features and a metadata prediction by applying a supervised metadata model to the metadata features; and combining the text prediction and the metadata prediction to predict that the document comprises malicious code.

16. The method of claim 15, further comprising:

extracting executable code content from the document;

deriving executable code features from the executable code content; and generating an executable code prediction by applying a supervised executable code model to the executable code features, wherein predicting that the document comprises malicious code further combines the text prediction and the metadata prediction with the executable code prediction.

17. The method of claim 15, further comprising:

in response to predicting that the document comprises malicious code, identifying, using the text features, an operation of the malicious code.

18. The method of claim 15, further comprising:

extracting training metadata content from a plurality of training documents of a plurality of document types;

deriving training metadata features from the training metadata content;

balancing the plurality of training documents using the training metadata features to obtain a balanced plurality of training documents; and training, using the training metadata features, a plurality of metadata models on the balanced plurality of training documents.

19. The method of claim 18, wherein balancing the plurality of training documents comprises:

applying unsupervised clustering to the plurality of document types based on similarities among the training metadata features derived from the plurality of training documents.

20. The method of claim 18, further comprising:

selecting a metadata model from the plurality of metadata models based on the performance of the metadata model, relative to the performance of the plurality of metadata models, when applied to the balanced plurality of training documents.

\* \* \* \* \*